United States Patent
Wuest et al.

(10) Patent No.: US 12,305,438 B2
(45) Date of Patent: May 20, 2025

(54) CLOSURE ELEMENT OF A MOTOR VEHICLE

(71) Applicant: Brose Fahrzeugteile SE & Co. Kommanditgesellschaft, Bamberg, Bamberg (DE)

(72) Inventors: Michael Wuest, Muhr am See (DE); Carsten Topf, Schonungen (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 46 days.

(21) Appl. No.: 18/209,838

(22) Filed: Jun. 14, 2023

(65) Prior Publication Data

US 2023/0323722 A1   Oct. 12, 2023

Related U.S. Application Data

(63) Continuation of application No. PCT/EP2021/084693, filed on Dec. 8, 2021.

(30) Foreign Application Priority Data

Dec. 15, 2020  (DE) .................. 10 2020 215 925.4

(51) Int. Cl.
*E05F 15/40*   (2015.01)
*B60R 13/04*   (2006.01)

(52) U.S. Cl.
CPC .............. *E05F 15/40* (2015.01); *B60R 13/04* (2013.01); *E05Y 2600/46* (2013.01); *E05Y 2900/531* (2013.01)

(58) Field of Classification Search
CPC ...... E05F 15/40; B60R 13/04; E05Y 2600/46; E05Y 2900/531
See application file for complete search history.

(56) References Cited

U.S. PATENT DOCUMENTS

| | | | |
|---|---|---|---|
| 2017/0160385 A1 | 6/2017 | Iske et al. | |
| 2019/0128040 A1* | 5/2019 | Mitchell | ................ E05F 15/40 |
| 2019/0267705 A1 | 8/2019 | Klar et al. | |
| 2020/0072947 A1* | 3/2020 | Miu | ....................... G01S 17/931 |

FOREIGN PATENT DOCUMENTS

| | | | | |
|---|---|---|---|---|
| DE | 19745309 A1 | | 4/1999 | |
| DE | 10305980 A1 | | 9/2004 | |
| DE | 102014211446 A1 | * | 12/2015 | ........... G01S 13/931 |
| DE | 102014010383 A1 | | 1/2016 | |
| DE | 102014212780 A1 | | 1/2016 | |
| DE | 102016217057 A1 | | 3/2018 | |
| DE | 102019123282 A1 | | 3/2020 | |
| DE | 202020104648 U1 | | 8/2020 | |

OTHER PUBLICATIONS

International Search Report dated Mar. 18, 2022 in corresponding application PCT/EP2021/084693.

\* cited by examiner

*Primary Examiner* — Adnan Aziz
*Assistant Examiner* — James E Munion
(74) *Attorney, Agent, or Firm* — Muncy, Geissler, Olds & Lowe, P.C.

(57) ABSTRACT

A closure element of a motor vehicle, the closure element having a closure body, to the exterior of which a decorative strip is connected. The decorative strip accommodates a radar sensor unit having a housing.

6 Claims, 2 Drawing Sheets

CLOSURE ELEMENT OF A MOTOR VEHICLE

This nonprovisional application is a continuation of International Application No. PCT/EP2021/084693, which was filed on Dec. 8, 2021, and which claims priority to German Patent Application No. 10 2020 215 925.4, which was filed in Germany on Dec. 15, 2020, and which are both herein incorporated by reference.

BACKGROUND OF THE INVENTION

Field of the Invention

The present invention relates to a closure element of a motor vehicle. The closure element has a closure body to the exterior of which a decorative strip is connected.

Description of the Background Art

Motor vehicles usually have a number of closure elements through which loading and/or access to an interior of the motor vehicle are made possible. Such closure elements are thus, for example, a hatch door, an engine hood, side doors, etc. Each of these closure elements usually has a closure body that is movably mounted on a car body of the motor vehicle. The closure body is usually designed to be comparatively robust, and is therefore usually made of a metal. In order to realize a visually pleasing/appealing response and to prevent corrosion, the closure body is usually painted. If the closure body is moved against an obstacle when the closure element is opened, it is possible that, on the one hand, the closure body will be deformed. On the other hand, it is possible that the painting is at least partially damaged, so that corrosion is possible. Both times the repair is comparatively costly.

To overcome the aforementioned deficiency, a decorative strip is usually provided, which is located on the exterior of the respective closure body. The decorative strip usually protrudes with respect to the respective closure body, so that when the closure element is moved against an obstacle, contact is first made with the decorative strip, by means of which the closure body is thus protected. The decorative strip is usually made of a plastic, which is comparatively elastic. Therefore, no damage occurs when the closure element is moved relatively gently against the obstacle. However, if the closure element is damaged, it is only necessary to replace the decorative strip, which is comparatively inexpensive.

The vehicle's surroundings are also being increasingly monitored for objects by means of a sensor. This is used, for example, when maneuvering the motor vehicle so that movement of the motor vehicle against the object is avoided. Also, the range of movement of the closure elements is usually monitored by means of a corresponding sensor to ensure that there is no obstruction therein when the closure element is moved.

For example, a capacitive sensor is used as such a sensor. However, spatial resolution is relatively low with such a sensor. An alternative to this is monitoring by means of a camera, wherein interference-free operation requires appropriate illumination of the surroundings. Soiling of the camera also disrupts its operation relatively greatly. A preferred variant therefore is the use of a radar sensor, which can detect a corresponding obstacle with a relatively precise spatial resolution essentially independent of weather conditions. In this case as well, the operation of the sensor is also not apparent to the user, so that the user is not bothered.

However, because the radar waves emitted by the radar sensor and to be received cannot completely penetrate the metal of the closure body, or are at least relatively greatly attenuated, a cutout is usually provided in the closure body through which the radar waves can enter and exit. To prevent foreign particles from entering the motor vehicle or to prevent excessive air exchange, the cutout is usually closed with a material that is transparent to radar waves, for example, a plastic. So that this is realized and that no undesirable effects are exerted on the radar waves, the manufacturing tolerances are chosen to be relatively low. The closure body put together in this way is usually completely painted, so that the cutout is not visible to a user. As a result, manufacturing costs are relatively high.

SUMMARY OF THE INVENTION

It is therefore an object of the present invention to provide a closure element for a motor vehicle, wherein manufacturing costs are advantageously reduced.

The closure element can be a component of a motor vehicle, which is in particular land-based. The closure elements can be, for example, a hatch door, an engine hood, side doors, sliding doors, filler caps, etc. The motor vehicle can be expediently positioned substantially freely on a roadway and is thus not rail-guided. For example, the motor vehicle can be a commercial vehicle, such as a truck or bus. Particularly preferably, however, the motor vehicle is a passenger car.

The closure element has a closure body. In particular, the closure body can have a flat design and is used to close an opening in a car body of the motor vehicle. The closure body is suitable, in particular provided and set up, for this purpose. In particular, it is possible in this case to move the closure body and thus the closure element into an open position and also into a closed position. For example, the closure body can be made from a single component, suitably made of a material other than metal, or the closure body comprises a number of individual components. In the mounted state, the closure body can be mounted in particular movably on the car body of the motor vehicle, for example, pivotably or at least partially transversely displaceably. For this purpose, the closure element can comprise a corresponding bearing assembly, for example, a hinge. Such a closure element is thus in particular a hatch door, an engine hood or, for example, a door, which is pivotably mounted, for example. Further, the closure element can also be a sliding door.

The closure element can further comprise a decorative strip, such as one that is connected to the exterior of the closure body. In other words, the decorative strip is located on the closure body side which faces away from the additional components of the motor vehicle and which at least does not protrude into an interior of the motor vehicle when the closure element is in the closed state. Preferably, the decorative strip thus forms at least partially an outer boundary of the motor vehicle. The decorative strip is expediently made of a plastic and painted, for example, in the same color as the closure body. In particular, the decorative strip is detachably fastened to the closure body, for example, by means of clips.

The decorative strip can accommodate a radar sensor unit, comprising a housing. Thus, the radar sensor unit is present as a single unit, wherein the radar sensor unit is mounted by means of mounting the housing. The housing is completely accommodated by the decorative strip and thus enclosed by means of the decorative strip. As a result, the radar sensor unit is protected by means of the decorative strip, so that it is not necessary to design the housing of the radar sensor unit as relatively robust. As a result, manufacturing costs are reduced.

Because the radar sensor unit is also accommodated by the decorative strip, it may not be visually noticeable from outside the motor vehicle, which is why a visual impression is improved. Further, the radar sensor unit is located outside the motor vehicle, so that the radar waves emitted and received by the radar sensor unit are not impaired or distorted by the closure body. Thus, operation of the radar sensor unit is simplified, and it can be operated with a comparatively low power. Also, the accuracy of detecting objects by the radar sensor unit is improved in this way. In this case, it is not necessary to adapt the closure body accordingly, which is why manufacturing costs are reduced.

Because the radar sensor unit is also disposed comparatively far outside due to the position of the decorative strip, therefore, outside an interior of the motor vehicle, and protrudes to the outside over the closure body and other components of the car body, which are made of metal, for example, a possible monitoring area is also increased. As a result, it is possible to monitor a comparatively large area by means of a single radar sensor unit, and a plurality of such radar sensor units is not required. Thus, manufacturing costs are reduced further.

The radar sensor unit operates, for example, at a frequency of substantially 18 GHz. Thus, radar waves with a frequency of substantially 18 GHz are emitted during operation. Particularly preferably, however, the radar sensor unit is operated at a frequency between 78 GHz and 81 GHz. Consequently, radar waves with a frequency between 78 GHz and 81 GHz are transmitted/received during operation. Due to the increased frequency, bandwidth and also distance resolution are increased. In a refinement, multiple radar sensor units are accommodated by the decorative strip, so that spatial resolution is improved. For example, the radar sensor unit is thermally contacted with the closure body. Thus, the radar sensor unit is cooled via the closure body, which increases operational safety and reliability.

The radar sensor unit can be used for pinch protection. Alternatively, the radar sensor unit is used to monitor a range of movement of the closure element during operation. Preferably, during operation the radar sensor unit can monitor whether the closure element, in particular the closure body and/or the decorative strip, is pivoted against a curb or other obstacle. Provided that a curb or the like is identified, a warning can be issued. If the closure element is moved by an electric motor, the electric motor is preferably stopped in this case, and the movement is thus ended. Thus, the radar sensor unit is used for collision protection. Alternatively, a gesture or the like performed by a user of the motor vehicle is recognized during operation by means of the radar sensor unit. In particular, depending on the detected gesture, an assistance system of the motor vehicle is activated during operation, for example, the electric motor, if any, so that the closure body can be subsequently pivoted. In a further example, the radar sensor unit can be used to monitor the surroundings of the motor vehicle, so that the motor vehicle is not moved against an obstacle detected by the radar sensor unit during maneuvering. In summary, the radar sensor unit can be used either for detecting the surroundings or to avoid collisions, especially in the case of automatically driven closure elements such as hinged doors (side doors, hatch doors, frunk lids) or sliding doors. Preferably, the radar sensor unit can be provided and set up to monitor an area extending between 1 m and up to 0 m away from the motor vehicle. In particular, a delivered power is adjusted accordingly in this case. Thus, on the one hand, an energy requirement is reduced. On the other hand, excessive radiation exposure is avoided.

The shape of the housing can be similar to the shape of the decorative strip so that accommodation of the housing by the decorative strip is simplified. Thus, in particular, the housing can have a relatively elongated shape. Expediently the housing is designed to be relatively flat and elongated, which simplifies mounting. Thus, preferably, the horizontal extent of the housing, directed away from a motor vehicle, is relatively small and, for example, less than 1 cm or 0.5 cm. In the other horizontal direction, which is perpendicular to this, the extent is relatively large and, for example, greater than 2 cm, 5 cm, or 10 cm. Thus, on the one hand, sufficient volume is provided within the housing for the individual components of the radar sensor unit. On the other hand, in this way it is not necessary to modify existing decorative strips or at least their external dimensions.

The decorative strip can have a receptacle provided and set up for the radar sensor unit, in particular the housing. The receptacle can be designed as a recess and is closed on its periphery, for example. Particularly preferably, however, the recess is cup-shaped so that mounting of the housing on the decorative strip is simplified. Thus, it is suitably possible to insert the radar sensor unit into the recess after the decorative strip has been manufactured.

The radar sensor unit can be fastened to the closure body, for example by means of a retaining structure. The radar sensor unit can be concealed by means of the decorative strip. For this purpose, the radar sensor unit lies within the receptacle and is thus accommodated by the decorative strip. In this regard, the radar sensor unit is loosely disposed in the receptacle, for example. In other words, the radar sensor unit may not be directly fastened to the decorative strip.

For example, the radar sensor unit can be detachably fastened to the decorative strip and, for example, screwed or clipped to it. In this way, it is possible to replace a faulty radar sensor unit or a damaged decorative strip separately in each case without having to replace the other part as well.

Alternatively, the housing can be cast with the decorative strip. In this way, penetration of dirt particles or liquids into the housing is prevented, which could otherwise compromise functional safety. In addition, the combination of the decorative strip and the radar sensor unit is designed to be relatively robust in this way. Thus, in this case the housing is stabilized by means of the decorative strip, which is why the housing itself can be designed relatively delicate, which reduces weight and manufacturing costs. As an alternative to casting, the housing is glued to the decorative strip, for example. Thus, manufacturing is simplified, although stability is slightly reduced compared to casting.

For example, the housing can have the same orientation as the decorative strip or the closure body in the area where the decorative strip is connected. Particularly preferably, however, the housing can be inclined with respect to the closure body, which the latter has in the region of the decorative strip. In other words, the housing and the closure body enclose an angle to one another. Here, it is possible that the closure body can have different orientations, for example, and is curved, for example. Thus, it is possible for the housing and the closure body to be disposed parallel to one another, but in an area spaced apart from the decorative strip. Due to the inclination of the housing with respect to the closure body, there is improved monitoring of the surroundings of the motor vehicle, and it is not necessary to adjust the mounting location of the decorative strip to the housing and thus the radar sensor unit. Due to the inclined housing, a radiation and reception direction of the radar sensor unit is adjustable and preferably oriented substantially horizontally, so that a possible so-called main lobe is oriented substantially horizontally.

Alternatively, the main lobe, therefore, the area of increased radiation intensity/sensitivity, can be pivoted upwards with respect to the horizontal line, so that the decorative strip can also be connected in a relatively low area of the closure body. Thus, a movement of the closure body against a relative low obstacle can be intercepted by means of the decorative strip.

For example, the housing can be made of a plastic and is, for example, an injection molded part. Here, in one embodiment, the thickness of the walls of the housing is the same everywhere. Particularly preferably, however, the housing is formed by means of a film on the side facing away from the closure body. Thus, the thickness of this wall is relatively small and less than 0.1 mm or 0.05 mm. Due to the relatively small thickness, penetration by means of the radar waves is essentially unaffected, which simplifies operation of the radar sensor unit. Also, in this way, an extent of the radar sensor unit directed away from the closure body is relatively small, so that a thickness of the decorative strip, therefore, the protrusion of the decorative strip beyond the closure body, can be selected to be relatively small. Consequently, on the one hand, air resistance is reduced. On the other hand, an attractive exterior is realized. Due to the film, however, penetration of foreign particles into the housing is prevented before mounting, so that safety is increased. In particular, with the exception of the film, the housing is designed relatively robust and is preferably made of a plastic.

A printed circuit board can be disposed in the housing, which is made of a glass fiber-reinforced epoxy resin, for example. By means of the circuit board, some, preferably any, electrical/electronic components of the radar sensor unit are stabilized with respect to one another, which increases robustness. In other words, the circuit board is used to provide a circuit by means of which the function of the radar sensor unit is realized.

The radar sensor unit comprises a radar antenna which is used to transmit and/or receive the radar waves. For example, two radar antennas are provided, wherein one is used to transmit and the other to receive the radar waves. Alternatively, there is only one radar antenna, which is operated alternately in time either for only receiving or transmitting the radar waves. In a further alternative, multiple radar antennas are present, wherein at least a part thereof is used alternately in time both for transmitting and for receiving the radar waves.

For example, the radar antenna can be located on the circuit board side facing the closure body. Particularly preferably, however, the radar antenna is connected, in particular soldered, to the circuit board on the side opposite the closure body. In this way, the emission/reception of the radar waves is not obstructed by the circuit board itself, so that operation is improved. It is also possible to suitably direct the radar waves by means of the circuit board, in particular by means of one or more circuit board traces, so that emission is improved.

For example, the radar antenna is formed at least in part by means of a trace of the circuit board. Preferably, however, the radar antenna is a component of a radar sensor chip, which thus has circuitry and is designed in particular as an integrated circuit. Thus, the radar sensor chip is located on the same side of the circuit board as the radar antenna, therefore, on the side opposite the closure body. Preferably, the antenna forms the radar sensor chip end opposite the circuit board. During operation, the radar sensor chip is used to control the radar antenna and/or to evaluate the radar waves detected by the radar antenna. In other words, the radar antenna is designed as a so-called "antenna on package." Thus, essentially the main function of the radar sensor unit is provided by means of the radar sensor chip, which is why mounting is simplified. It is also possible to set up the radar sensor unit in a relatively space-saving manner. Further, the number of individual components is reduced, so that storage is simplified. The radar sensor chip is preferably mounted on the circuit board using surface mount technology (SMT) and has, for example, a so-called BGA (ball grid array). Mounting is further simplified in this way.

For example, additional components can be connected, preferably soldered, to the circuit board. The additional components can be electrical and/or electronic components and serve to operate the radar sensor unit, for example, the power supply and/or communication. For example, the additional components are located on the same side of the circuit board as the radar sensor chip. Therefore, it is possible to populate the circuit board only on one side, which simplifies manufacturing. Alternatively, the additional components are arranged arbitrarily on both sides of the circuit board. In this way, it is possible to select a circuit board with comparatively small dimensions.

The additional components can be arranged on the circuit board side facing the closure body. Thus, operation of the radar sensor chip and the radar antenna is not impaired by these additional components. Preferably, only such additional components that have a lower height than the radar sensor chip, therefore, a smaller extent perpendicular to the circuit board than the radar sensor chip, are connected to the circuit board on the side of the radar antenna. Consequently, the radar sensor chip is the highest part connected to this side of the circuit board. As a result, during operation, the radar waves emitted and received by the radar sensor chip are essentially unaffected by the additional components, because an area directed away from the circuit board is monitored by it. Also, the components are not affected by the radar waves, so no absorber is required between them and the radar antenna to protect the components from the radar waves. Thus, on the one hand, the space requirement is reduced. On the other hand, manufacturing costs are reduced.

The radar antenna can be separate from a control chip by means of which the radar antenna is operated, which therefore comprises the evaluation circuit, and by means of which the radar antenna is controlled. The control chip can also be designed as an integrated circuit, which simplifies mounting. For example, the control chip is a surface mount device (SMD). The radar antenna and control chip are connected to one another in terms of signaling and consequently also electrically, in particular via at least one trace of the circuit board.

For example, the control chip can be arranged on the same side as the radar antenna, so that relatively short signal paths are realized on the one hand. On the other hand, mounting is simplified in this way. In particular, all additional components are arranged on the same side as the radar antenna, which simplifies manufacturing. Suitably, the height of the additional components is lower than the height of the control chip so that they are not affected by the radar waves.

The control chip can be located on the circuit board side opposite the radar antenna and thus faces the closure body.

In particular, the control chip is contacted with the radar antenna by means of a plated-through hole. Due to the arrangement, the control chip is not irradiated or only irradiated to a comparatively small extent by the radar waves emitted by the radar antenna, so that there is no or only a slight interference with the functioning of the control chip. As a result, an absorber is not required, which reduces manufacturing costs and/or weight. Preferably, the projections of the radar antenna and the control chip onto the printed circuit board overlap at least partially so that the signal paths are comparatively short. Expediently, all additional components, if any, mounted on the circuit board, are located on the side of the control chip, so that the circuit board serves as a shield against the radar waves emitted and/or received by the radar antenna. Thus, an absorber is not required there either.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
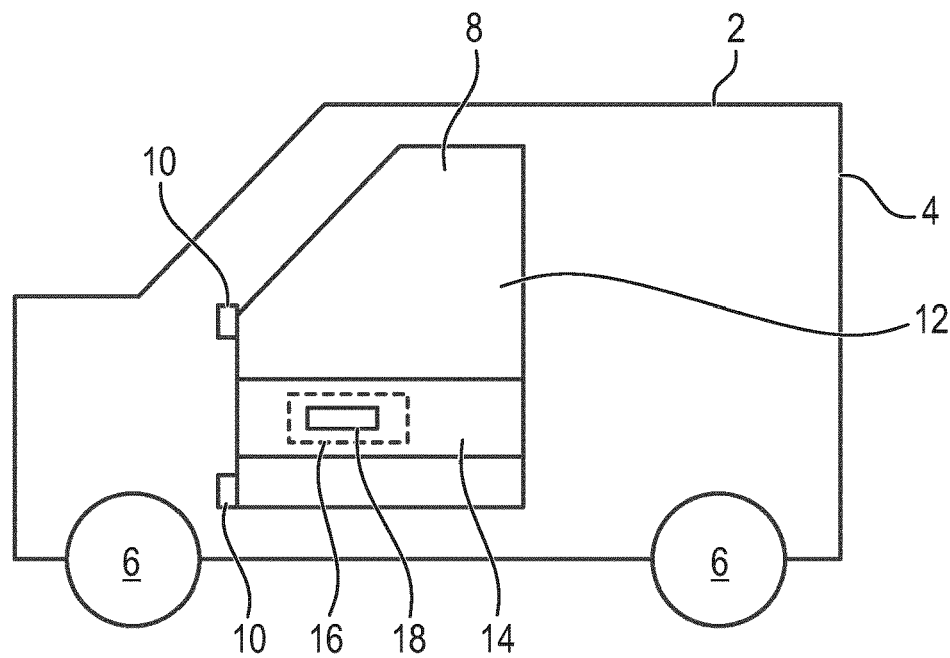
FIG. 1 schematically shows a motor vehicle with a closure element which has a closure body and a decorative strip.

In FIG. 1, a motor vehicle 2 in the form of a passenger car is shown in a schematically simplified view. Motor vehicle 2 has a car body 4 which is connected to four wheels 6, two of which are shown, by means of a chassis (not shown in more detail). Contact is made with a roadway (not shown in more detail) by means of wheels 6. Car body 4 is made of a metal and has multiple openings which are not shown. The openings are each closed by means of a closure element 8 which is movably mounted on car body 4 by means of corresponding bearings 10, here in the form of hinges. Thus, it is possible to pivot the respective closure element 8 with respect to car body 4 and thus to release or close the opening of car body 4. Closure element 8 shown here is a side door of motor vehicle 2.

Closure element 8 comprises a closure body 12, which is pivotally fastened to car body 4 by means of bearing 10. In this case, closure body 12 is partially made of a metal and is at least partially formed by means of a window pane (not shown in more detail). A decorative strip 14 made of an elastic plastic is connected to the exterior of closure body 12 and detachably fastened there by means of clips. Thus, replacement of decorative strip 14 is enabled. Decorative strip 14 and closure body 12 are painted in the same color, so there is no color difference between them.

Decorative strip 14, which may also be designed as a door panel, serves to prevent closure body 12 from contacting an obstacle, such as, for example, a post, when it is pivoted with respect to car body 4 and the obstacle is located within the pivoting range of closure body 12. Because decorative strip 14 is made of a plastic, elasticity is present, which is why no damage or only relatively minor damage occurs. In this case, however, corrosion of closure body 12 and thus consequential damage are prevented.

Figure 2:
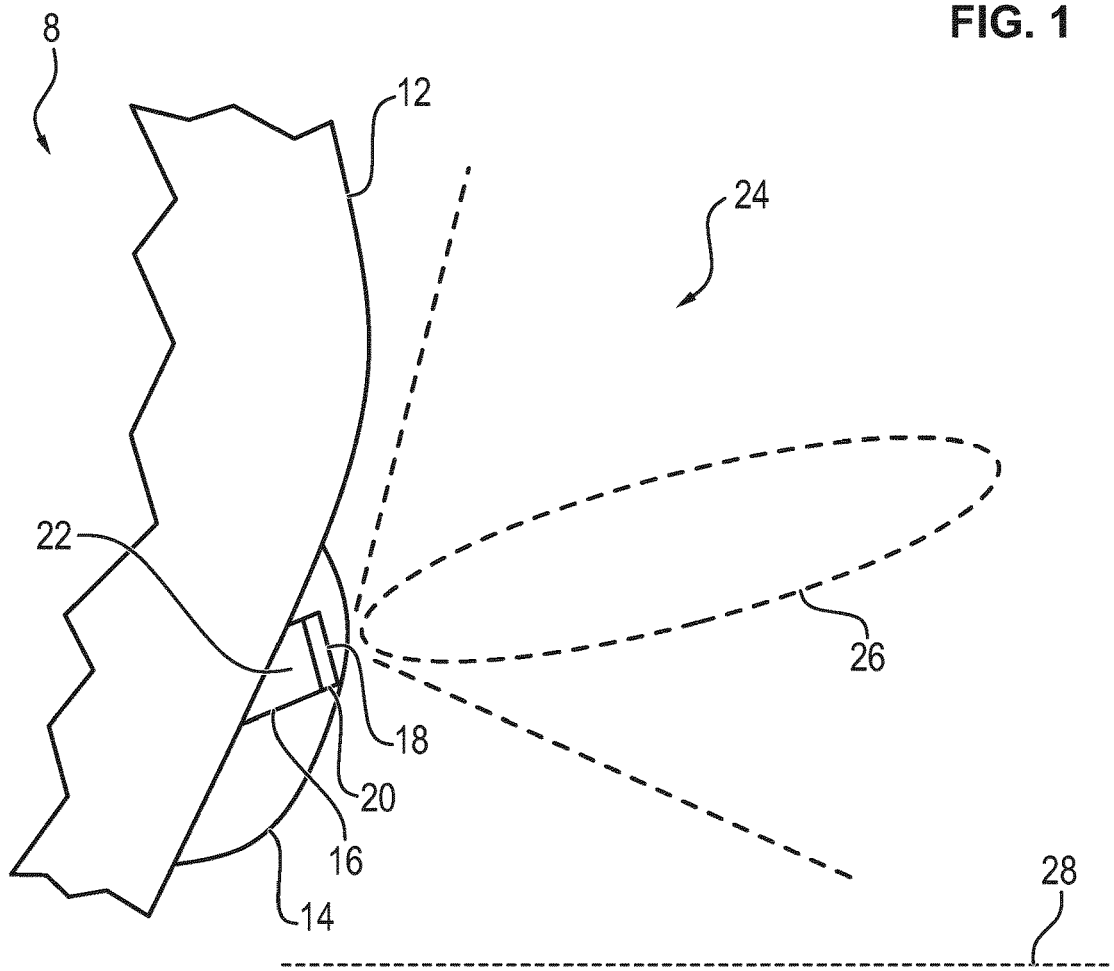
FIG. 2 shows in a sectional view the closure element with the decorative strip which accommodates a radar sensor unit.

As shown in FIG. 2 in a sectional detail view of closure element 8, decorative strip 14 has a recess 16 which is directed toward closure body 12 and is designed cup-shaped. Recess 16 is not noticeable in the mounted state. A radar sensor unit 18 is accommodated within recess 16 and has a housing 20, which represents the outer boundary of radar sensor unit 18. Here, housing 20 is inclined with respect to closure body 12 in the area of decorative strip 14. In other words, housing 20 and the area of closure body 12 to which decorative strip 14 is fastened enclose an angle that is different from 0° and, in particular, greater than 10°.

To stabilize housing 20 in recess 16, the recess is filled with a casting compound 22, which is a plastic, after housing 20 is inserted. Thus, housing 20 is cast with decorative strip 14, and radar sensor unit 18 is accommodated by decorative strip 14. In an alternative, housing 20 is clipped to decorative strip 14. For this purpose, recess 16 and housing 20 have clips which correspond to one another and are not shown.

Radar sensor unit 18 is used to monitor the surroundings around motor vehicle 2 for any obstacles. For this purpose, radar waves, which are reflected and/or scattered by any obstacle, are emitted during operation by radar sensor unit 18. The radar waves deflected in this way partially encounter radar sensor unit 18, so that they can be detected by means of radar sensor unit 18. The distance and/or position of the obstacle are inferred on the basis of the runtime required for this and/or a change in the signal shape.

Here, radar waves are emitted into a monitored area 24 by radar sensor unit 18, and radar waves can be received when they strike radar sensor unit 18 from the monitored area 24. Main lobe 26 in which the maximum intensity of the emitted radar waves is located is situated in the center of monitored area 24. Because housing 20 is inclined with respect to closure body 12 and main lobe 26 is arranged perpendicular to the side of the substantially rectangular housing 20, said side facing away from closure body 12, main lobe 26 is tilted vertically upward with respect to a horizontal line 24 so that not only ground around motor vehicle 2 is monitored by radar sensor unit 18. In the variant shown here, the area 26 monitored by radar sensor unit 18 has a solid angle of more than 90°, wherein main lobe 26 encloses an angle of substantially 10° with respect to the horizontal line 24.

Figure 3:
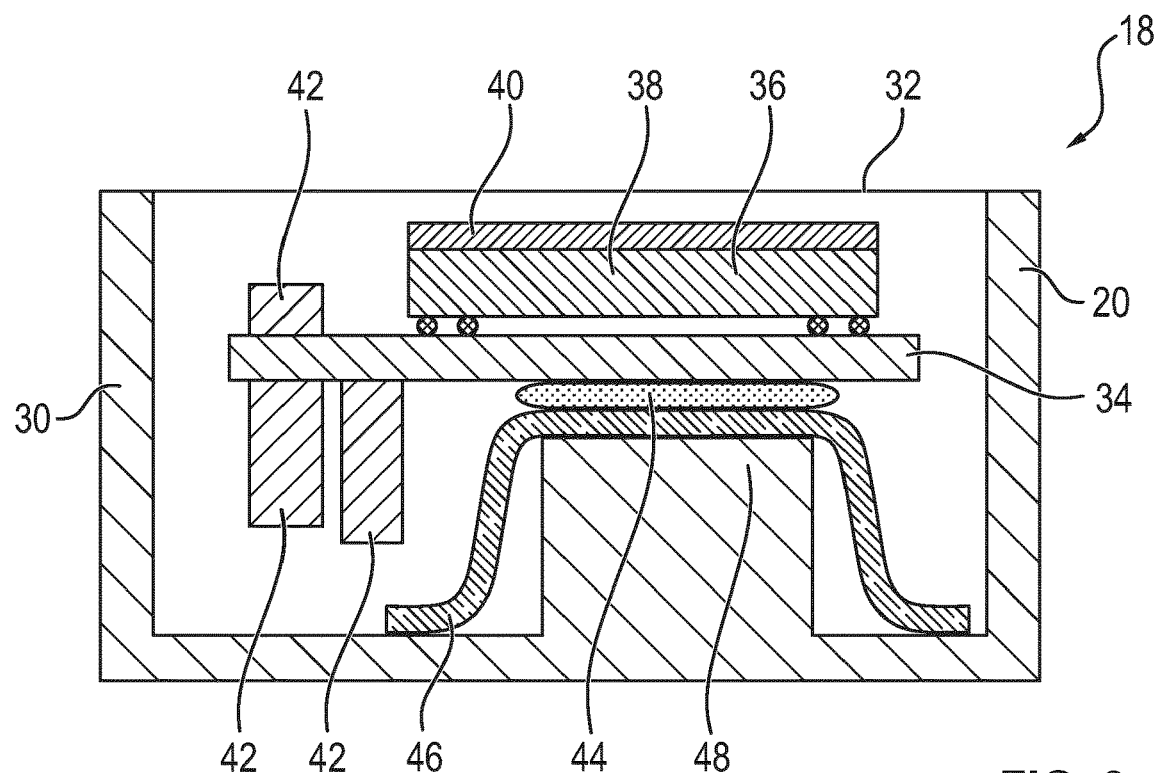
FIG. 3 shows the radar sensor unit in a sectional view.

FIG. 3 shows a first variant of radar sensor unit 18 in a cross section. Housing 20 has a bowl-shaped base body 30 which is fabricated of a plastic. Base body 30 is covered on the remaining side by a film 32, so that this side of housing 20 is formed by film 32. In the mounted state, housing 20 is positioned such that film 32 is located positioned on the side facing away from closure body 12. Film 32 is oriented perpendicular to main lobe 26. Thus, during operation, the radar waves emitted by radar sensor unit 18 do not pass through base body 30, but only through film 32, so that there is essentially no attenuation or interaction of housing 20 with the radar waves.

Because of film 32, the external dimensions of housing 20 are comparatively small, wherein penetration of particles into housing 20 prior to mounting in decorative strip 14 is nevertheless prevented. When housing 20 is mounted in recess 16, sealing is then performed by means of casting compound 22, so that the components of radar sensor unit 18 arranged in housing 20 are also protected from excessive mechanical action.

A circuit board 34, which is made of a glass fiber-reinforced epoxy resin, is disposed within housing 20. Circuit board 34 is arranged parallel to film 32, and a radar sensor chip 36, whose package shape is a BGA (ball grid array), is fastened to its side facing film 32. Radar sensor chip 36 comprises an integrated circuit 38 and a radar antenna 40, wherein integrated circuit 38 is located between radar antenna 40 and circuit board 34. Integrated circuit 38 is used to control radar antenna 40 so that the radar waves are emitted. Also, the radar waves detected by radar antenna 40 are evaluated by integrated circuit 38. In a preferred refinement, integrated circuit 38 also performs an evaluation of the received radar waves so that the position and/or the distance of the possible obstacle are determined by means of the circuit.

In summary, radar antenna 36 is a component of radar sensor chip 36, and radar antenna 36 is disposed on the side of circuit board 34 opposite to closure body 12. In particular, an absorber is disposed hereby between integrated circuit 38 and radar antenna 40, or radar antenna 40 is designed in such a way that none or only a relatively small amount of the radar waves emitted by radar antenna 40 penetrates into integrated circuit 38. Operational safety is thus increased.

Other electrical and/or electronic components 42 are connected to circuit board 34. Components 42 are, for example, capacitors, resistors, or chips. Here, on the side of radar sensor chip 36, there are only such components 42 that have a lower height than radar sensor chip 36, therefore, whose maximum distance to circuit board 34 is less than the distance of radar antenna 40 to circuit board 34. Thus, these (additional) components 42 are not irradiated by the radar waves emitted by radar antenna 40, which is why no absorber is required between them and radar sensor chip 36 in order to ensure the functional safety of components 42. As a result, the weight and size of radar sensor unit 18 are reduced.

Components 42, which have a greater height, are located on the side opposite radar sensor chip 36, therefore, on the side facing closure body 12. Further, a U-shaped heat sink 46, which is made of a metal, is connected in a planar manner on this side using a thermal paste 44. Base body 30 has a pedestal 48 on the inside, on which heat sink 46 is seated, and by means of which heat sink 46 is pressed against circuit board 34, so that there is reliable thermal contact.

Figure 4:
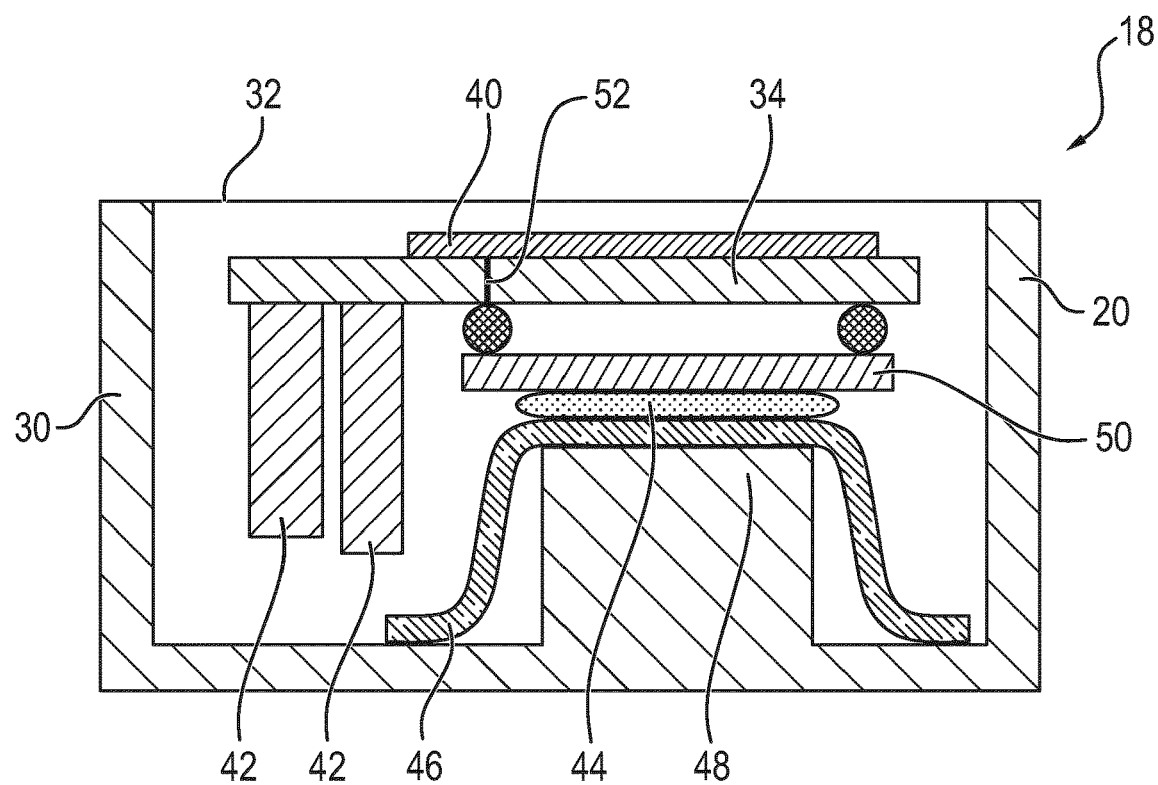
FIG. 4 shows an alternative embodiment of the radar sensor unit according to FIG. 3.

A modification of radar sensor unit 18 is shown in FIG. 4. Here, housing 20 with base body 30 and film 32 as well as pedestal 48 are not changed. Also, again, circuit board 34 is present, which is arranged parallel to film 32. However, instead of radar sensor chip 36, radar antenna 40 is created using a separate component, such as a trace of circuit board 34. Radar antenna 40 is again located on the side of circuit board 34, said side facing film 32 and thus facing away from closure body 12.

Radar antenna 40 is operated by means of a control chip 50, which again has a BGA as its design and which undertakes the same tasks as integrated circuit 38 from the previous embodiment. However, control chip 50 and radar antenna 40 are structurally separated from each other, and control chip 50 is located on the side of circuit board 34, said side facing closure body 12, so that circuit board 34 is disposed between radar antenna 40 and control chip 50. Radar antenna 40 and control chip 50 are connected to one another in terms of signaling and electrically by means of a plated-through hole 52. Here, the projections of radar antenna 40 and control chip 50 onto the circuit board overlap one another, so that the signal connection between them is relatively short.

Control chip 50 is in thermal contact with heat sink 46, which in turn is stabilized by means of pedestal 48, via thermal paste 44. Radar sensor unit 18 in turn has the additional components 42, wherein all components 42 are located on the side of control chip 50 with respect to circuit board 34. Thus, any influence on them by the radar waves is essentially excluded or at least reduced by means of circuit board 34.

The invention is not limited to the exemplary embodiments described above. Rather, other variants of the invention can also be derived herefrom by the skilled artisan, without going beyond the subject matter of the invention. Particularly, further all individual features described in relation to the individual exemplary embodiments can also be combined with one another in a different manner, without going beyond the subject of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A closure element of a motor vehicle, the closure element comprising:
    a closure body to an exterior of which a decorative strip is connected, wherein the decorative strip accommodates a radar sensor unit having a housing,
    wherein a circuit board is disposed in the housing, wherein a radar antenna is connected to the side of the circuit board, the side being opposite to the closure body,
    wherein the radar antenna is a component of a radar sensor chip,
    wherein only components that have a lower height than the radar sensor chip are connected to the circuit board on the side of the radar antenna.

2. The closure element according to claim 1, wherein the housing is clipped to the decorative strip.

3. The closure element according to claim 1, wherein the housing is cast with the decorative strip.

4. The closure element according to claim 1, wherein the housing is inclined with respect to the closure body in the region of the decorative strip.

5. The closure element according to claim 1, wherein the housing is formed by a film on the side facing away from the closure body.

6. The closure element according to claim 1, wherein a control chip is connected to the circuit board on the side opposite the radar antenna, wherein the radar antenna is connected in terms of signaling to the control chip by the circuit board and is operated thereby.

* * * * *